(12) United States Patent
Thottupurathu et al.

(10) Patent No.: US 8,673,440 B2
(45) Date of Patent: **\*Mar. 18, 2014**

(54) POROUS MEMBRANE

(75) Inventors: Gopakumar Thottupurathu, Overland Park, KS (US); David Kazemi, Lee'Summit, MO (US)

(73) Assignee: BHA Altair, LLC, Franklin, TN (US)

( * ) Notice: Subject to any disclaimer, the term of this patent is extended or adjusted under 35 U.S.C. 154(b) by 214 days.

This patent is subject to a terminal disclaimer.

(21) Appl. No.: 12/609,444

(22) Filed: Oct. 30, 2009

(65) Prior Publication Data

US 2011/0104472 A1    May 5, 2011

(51) Int. Cl.
*B32B 3/26* (2006.01)
*D01D 10/02* (2006.01)
*B29C 47/06* (2006.01)

(52) U.S. Cl.
USPC .............. 428/316.6; 428/315.5; 428/315.7; 428/421; 264/173.1; 156/244.27; 156/244.24; 156/229

(58) Field of Classification Search
USPC .............. 428/315.5, 315.7, 316.6, 421; 264/173.1; 156/244.27, 244.24, 229
See application file for complete search history.

(56) References Cited

U.S. PATENT DOCUMENTS

| | | | |
|---|---|---|---|
| 4,385,093 A | 5/1983 | Hubis | |
| 5,064,593 A | 11/1991 | Tamaru et al. | |
| 5,415,939 A | 5/1995 | Yeung | |
| 6,500,532 B1 | 12/2002 | Ruefer et al. | |
| 6,712,919 B2 | 3/2004 | Ruefer et al. | |
| 6,852,223 B2 | 2/2005 | Huang et al. | |
| 7,306,729 B2 | 12/2007 | Bacino et al. | |
| 7,306,841 B2 | 12/2007 | Ruefer et al. | |
| 8,123,839 B2 * | 2/2012 | Abe et al. | 96/4 |
| 2004/0059717 A1 * | 3/2004 | Klare et al. | 707/2 |
| 2007/0012624 A1 | 1/2007 | Bacino et al. | 210/650 |
| 2010/0283214 A1 * | 11/2010 | Hisano et al. | 277/654 |
| 2010/0316819 A1 * | 12/2010 | Bansal et al. | 428/35.7 |
| 2011/0268959 A1 * | 11/2011 | Thottupurathu | 428/315.5 |

FOREIGN PATENT DOCUMENTS

WO     2005118254 A1    12/2005
WO  WO 2009038181 A1 *  3/2009

* cited by examiner

*Primary Examiner* — Hai Vo
(74) *Attorney, Agent, or Firm* — Reinhart Boerner Van Deuren P.C.

(57) ABSTRACT

A membrane comprises a sheet of expanded polytetrafluoroethylene. The sheet includes a first extrudate made from a first PTFE fine powder resin mixed with processing lubricant at a first lube rate. A second extrudate is made from the first PTFE fine powder resin mixed with processing lubricant at the first lube rate. The first and second extrudates combined into an integrated tape structure that is stretched in first and second directions. The sheet is porous and has a gas permeability of at least 0.1 CFM according to ASTM D737. The sheet has an average Mullen Hydrostatic Burst pressure in the range of 135 psi to 175 psi according to ASTM D751.

13 Claims, 2 Drawing Sheets

POROUS MEMBRANE

BACKGROUND OF THE INVENTION

The present invention is generally directed to a porous membrane. In particular, the present invention is directed to a porous expanded polytetrafluoroethylene membrane having improved properties and made from multiple extrudates.

Membranes made from expanded polytetrafluoroethylene (ePTFE) are known. Such known membranes are used in many applications because of their chemical inertness. Exemplary applications for ePTFE membrane use include waterproof and breathable garments, fluid filtration, medical implantation and venting.

The membranes are typically made to attain a particular property such as air permeability or moisture vapor transmission. The desired property can often be attained by producing a membrane with a predetermined pore size, thickness and/or unit weight. Previous attempts at improving membrane properties have been to coat the membrane with a polymer such as polyurethane or to use multiple membranes or intermediate membrane components to provide a composite membrane. Despite this ability to modify the ultimate resultant membrane, there is still a need to improve the membrane.

BRIEF DESCRIPTION OF THE INVENTION

One aspect of the invention is a membrane having at least one improved property, such as increased strength or durability. The membrane comprises a sheet of expanded polytetrafluoroethylene. The sheet is porous and has a gas permeability of at least 0.1 CFM according to ASTM D737. The sheet has an average Mullen Hydrostatic Burst pressure in the range of 135 psi to 175 psi according to ASTM D751.

Another aspect of the invention is a membrane that comprises a sheet of expanded polytetrafluoroethylene. The sheet includes a first extrudate made from a first PTFE fine powder resin mixed with processing lubricant at a first lube rate. A second extrudate is made from the first PTFE fine powder resin mixed with processing lubricant at the first lube rate. The first and second extrudates combined into an integrated tape structure that is bi-axially stretched. The sheet is porous and has a gas permeability of at least 0.1 CFM according to ASTM D737. The sheet has an average Mullen Hydrostatic Burst pressure in the range of 135 psi to 175 psi according to ASTM D751.

Another aspect of the invention is a method of making a membrane. The method comprises the steps of providing a first extrudate made from a first PTFE fine powder resin mixed with processing lubricant at a first tube rate. A second extrudate is provided and made from the first PTFE fine powder resin mixed with processing lubricant at the first lube rate. The first and second extrudates are overlaid. The overlaid first and second extrudates are calendered into an integrated tape. The integrated tape is stretched in the machine direction. The integrated tape is stretched in the transverse direction to provide a porous sheet that has a gas permeability of at least 0.1 CFM according to ASTM D737 and an average Mullen Hydrostatic Burst pressure in the range of 135 psi to 175 psi according to ASTM D751.

BRIEF DESCRIPTION OF THE DRAWINGS

Further features of the invention will become apparent to those skilled in the art to which the invention relates from reading the following description with reference to the accompanying drawings, in which.

DETAILED DESCRIPTION OF THE INVENTION

Figure 1:
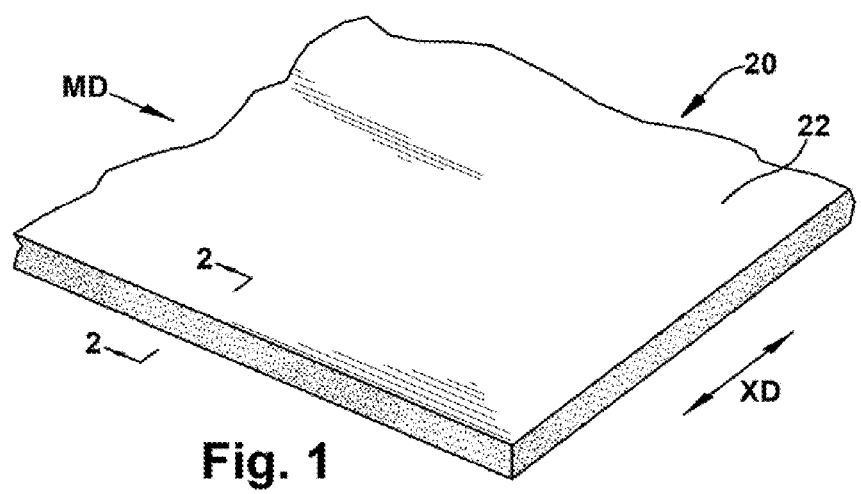
FIG. 1 is a perspective view of a portion of a sheet of membrane, constructed according to one aspect of the invention.
Figure 2:
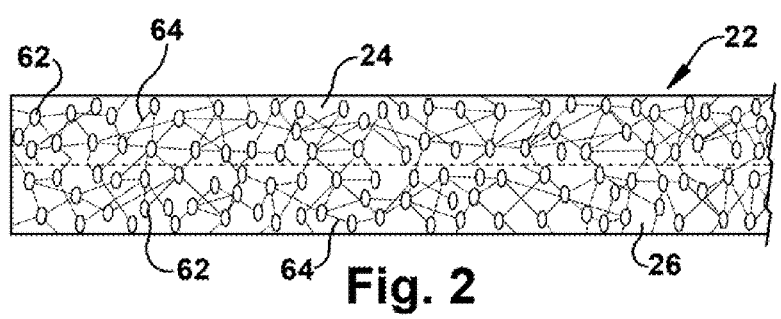
FIG. 2 is a cross-sectional view of the sheet of membrane illustrated in FIG. 1, taken approximately along line 2-2 in FIG. 1.
Figure 4:
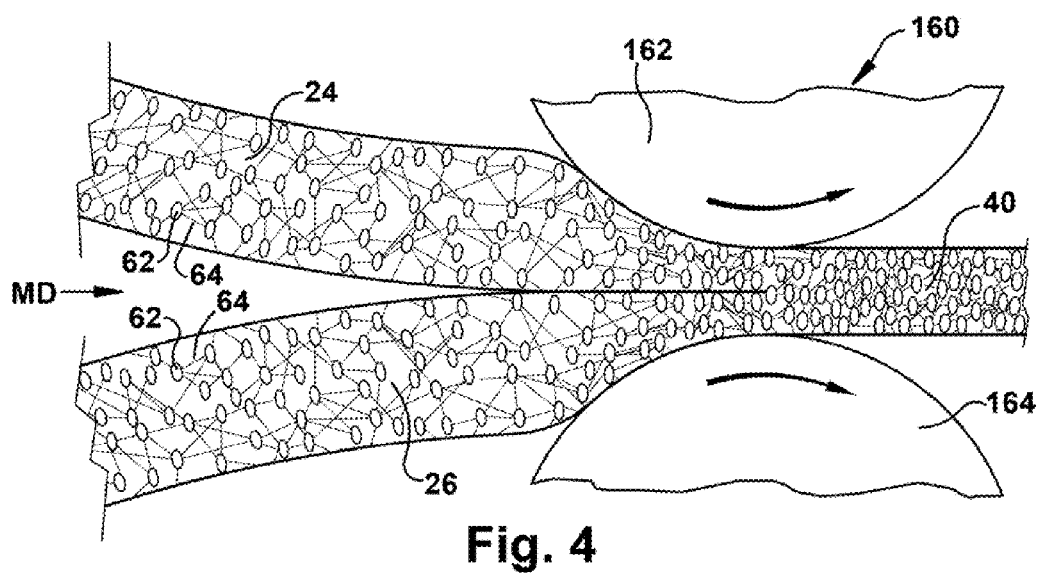
FIG. 4 is an enlarged view of a calender portion of the process illustrated in FIG. 3.
Figure 3:
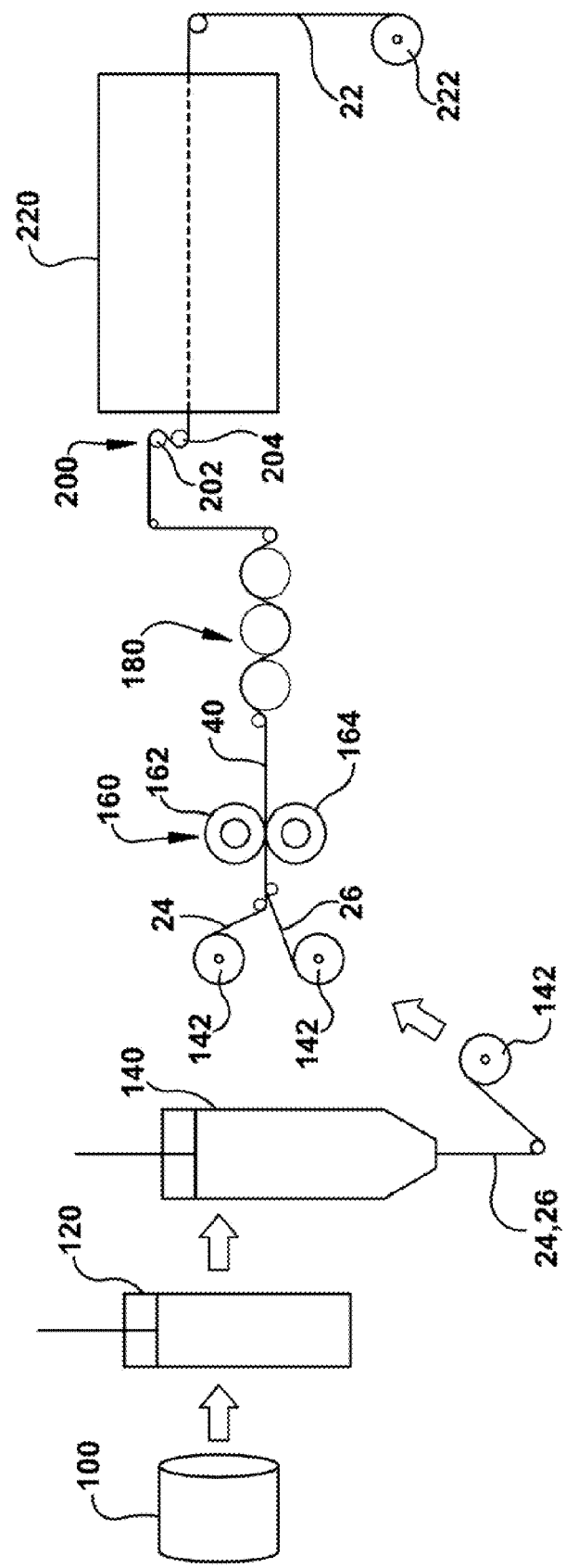
FIG. 3 is a schematic view of a process used to make the sheet of membrane, according to another aspect of the invention.

An improved membrane 20 (FIG. 1), made according to one aspect of the invention, is in the form of a sheet 22. The sheet 22 (FIG. 2) incorporates at least two identical layers or components. The components are in the form of extrudates 24, 26 made by a paste extrusion process. The extrudates 24, 26 are formed into an integrated tape structure 40 (FIGS. 3 and 4). The integrated tape structure 40 is bi-axially stretched to form the sheet 22.

The resultant sheet 22 of membrane 20 is porous, and preferably microporous, with a three-dimensional matrix or lattice type structure of numerous nodes 62 interconnected by numerous fibrils 64. The material that the sheet 22 is made from expanded polytetrafluoroethylene (ePTFE) that may or may not be sintered.

Surfaces of the nodes 62 and fibrils 64 define numerous interconnecting pores that extend completely through the sheet 22 between opposite major side surfaces of the membrane in a tortuous path. Preferably, the average size of the pores in the sheet 22 is sufficient to be deemed microporous, but any pore size may be used in the present invention. A suitable average size for the pores in the sheet 22 may be in the range of 0.01 to 1.0 micron, and preferably in the range of 0.01 to 0.25 micron and most preferably in the range of 0.01 to 0.10 micron. This porosity enables the sheet 22 to be permeable. For example, the sheet has an air permeability, measured according to ASTM D737 test method, in the range of about 0.10 CFM to 0.30 CFM.

The sheet 22 is made by mixing of polytetrafluoroethylene (PTFE) fine powder and lubricant in a mixer 100 (FIG. 3). The PTFE fine powder is available from DuPont as 601A or 603A TEFLON® fine powder resin. The lubricant is available from Exxon Mobile Corporation under the name ISOPA® K. By way of example, the amount of lubricant used the lube rate is in the range of 14 wt-% to 22 wt-% of lubricant to PTFE fine powder resin, preferably the lube rate is in the range of 15 wt-% to 17 wt-% of lubricant to PTFE fine powder resin and most preferably the lube rate is 16 wt. %. The mixer 100 may be any suitable mixing equipment, such as a PK Blender. Predetermined appropriate amounts of lubricant and PTFE fine powder resin are introduced into the mixer 100. The mixer 100 is rotated at a speed that will not "abuse" the PTFE fine powder resin. The mixer 100 is rotated for an appropriate time that allows the lubricant to sufficiently wet and protect the PTFE fine powder resin.

The mixture of lubricant and PTFE fine powder resin is introduced into a preformer 120. The preformer 120 mechanically compresses the mixture of lubricant and PTFE fine powder resin into a billet (not shown). The billet has an elongated cylindrical shape that can have any suitable diameter, such as in the range of about 2 inches to 6 inches. The billet may be stored at this stage to allow the lubricant to better penetrate into the PTFE fine powder resin.

The billet is placed in an extruder 140. The extruder 140 is a press that forces the mixture of lubricant and PTFE fine powder resin of the billet through a die of the extruder to yield the extrudate 24, 26. During the extrusion process, fibrils are formed as raw dispersion particles of the PTFE fine powder resin move passed one another. The extrudates 24, 26 have a predetermined thickness, dependent on the die configuration, in the range of about 0.035 inch to 0.045 inch and preferably about 0.040 inch. By way of example, according to one aspect of the invention the extrudates 24, 26 are substantially identical in thickness and lube rate. The extrudates may be wound up on a roll 142 for temporary storage.

The extrudates 24, 26 are trained off their respective rolls 142 and directed into a calender 160 (FIGS. 3 and 4). It will be apparent that, by way of example for this aspect of the invention, two extrudates 24, 26 are illustrated but any suitable number of extrudates of appropriate configuration may be used. As best seen in FIG. 3, the upper or first extrudate 24 is fed in the machine direction MD against rotating upper roller 162. The lower or second extrudate 26 is fed in the machine direction MD against rotating lower roller 164.

The calender 160 forms the integrated tape 40 from the extrudates 24, 26. The first and second extrudates 24, 26 are forced into engagement with one another because the gap between the rollers 162, 164 is less than the combined thicknesses of the extrudates 24, 26. The gap is in the range of about 0.010 inch to 0.030 inch and preferably about 0.020 inch. The rollers 162, 164 are metal and each heated to a temperature in the range of about 160° F. to 320° F., depending on the number and thickness of the extrudates 24, 26 used. The thickness of the integrated tape 40 is preferably in the range of about 0.010 inch to 0.030 inch and preferably about 0.020 inch.

The first and second extrudates 24, 26 are combined into the integrated tape structure 40 by mechanically interlocking the nodes 62 and fibrils 64 making up the first and second extrudates. That is, during the calender operation, a portion of the first extrudate 24 is forced into a portion of the second extrudate 26. This provides a relatively strong integrated tape structure 40 that enables other desirable improved properties of the finished sheet 22 of membrane 20.

The integrated tape structure 40 is trained over a series of heated drying rollers 180 (FIG. 3). The heated drying rollers 180 drive off any lubricant that is left in the integrated tape structure 40. The removed lubricant is collected in a collection system (not shown)

The integrated tape structure 40 is "expanded" or stretched in at least one and preferably two (bi-axially) directions to form the finished sheet 22 of membrane 20. "Expanded" is intended to mean sufficiently stretched beyond the elastic limit of the membrane material to introduce permanent set or elongation to the fibrils 64.

The integrated tape structure 40 is directed to a machine direction MD stretcher 200. The machine direction stretcher 200 has a first roller 202 that is rotating at a first speed. The machine direction stretcher 200 has a second roller 204 that is rotating at a second speed greater than the first speed of the first roller 202. The rollers 202, 204 are heated in the range of about 260° F. to 300° F. and preferably about 280° F. The surface speed differential of the second roller 204 rotating faster than the surface speed of the first roller 202 determines the ratio of machine direction MD stretch. The machine direction MD stretch ratio, according to one aspect of the invention, is in the range of about 1.0 to 6.0 and preferably in the range of about 2.0 to 3.5.

The integrated tape structure 40 is directed to a transverse or cross direction XD stretcher 220. The integrated tape structure 40 is clamped at its laterally opposite edges by parts of the cross direction XD stretcher 220. The integrated tape structure 40 is stretched in a second direction, substantially orthogonal to the machine direction MD a predetermined amount to form the sheet 22. The integrated tape structure 40 is stretched in the cross direction XD direction in the range of about 8 to 12 times its original cross direction dimension (width) and preferably about 10 times. The integrated tape structure 40 is stretched when exposed to elevated temperatures in the range of about 500° F. to 600° F. and preferably about 550° F.

The sheet 22 is preferably heated or "sintered" to reduce and minimize residual stress in the membrane material. The sheet 22 is preferably heated in the cross direction stretcher 220 by exposure to elevated temperatures in the range of about 700° F. to 750° F. and preferably about 730° F. However, the sheet 22 may be unsintered or partially sintered as is appropriate for the contemplated use of the membrane 20. The sheet 22 of the membrane 20 is the rolled onto roll 222.

The sheet 22 of membrane 20, according to one aspect of the invention, was tested against known membranes. Results of the testing are presented in the table below. Samples 1-5 are known ePTFE membranes only made from a single extrudate. Sample 6 is a known ePTFE membrane made from a single extrudate and coated with a polyurethane material. Samples 7-9 are sheets 22 of membrane 20 made according to one aspect of the invention. The sheet 22 of membrane 20, according to one aspect of the invention, has significantly improved desirable properties, such as Mullen Hydrostatic, which is indicative of strength and durability. The sheet 22 has an average Mullen Hydrostatic Burst pressure in the range of 135 psi to 175 psi according to ASTM D751 while retaining air permeability and preferably in the range of 135 psi to 175 psi.

| | | Mullen Hydrostatic ASTM D751 (PSI) | | | | Air Permeability ASTM D737 (CFM) | | | |
| --- | --- | --- | --- | --- | --- | --- | --- | --- | --- |
| Sample | Failure mode | Left | Center | Right | Average | Left | Center | Right | Average |
| 1 | Leak | 134 | 128 | 131 | 131 | | | | 0.35 |
| 2 | Leak | 105 | 94 | 105 | 101 | | | | 0.55 |
| 3 | Leak | 90 | 91 | 96 | 92 | | | | 0.65 |
| 4 | Leak | 120 | 120 | 123 | 121 | | | | 0.38 |
| 5 | Leak | 101 | 106 | 98 | 102 | | | | 0.75 |
| 6 | Leak | 101 | 101 | 97 | 100 | | | | |
| 7 | Burst | 174 | 173 | 176 | 174 | 0.228 | 0.259 | 0.237 | 0.241 |
| 8 | Burst | 172 | 165 | 166 | 168 | 0.227 | 0.254 | 0.250 | 0.244 |
| 9 | Burst | 152 | 139 | 153 | 148 | 0.273 | 0.272 | 0.282 | 0.276 |

From the above description of at least one aspect of the invention, those skilled in the art will perceive improvements, changes and modifications. Such improvements, changes and modifications within the skill of the art are intended to be covered by the appended claims.

What is claimed is:

1. A membrane comprising:
    a sheet of expanded polytetrafluoroethylene, wherein the sheet includes a first extrudate made from a first PTFE fine powder resin mixed with processing lubricant at a first lube rate of between 14 wt-% to 17 wt-% of the processing lubricant to the first PTFE fine powder resin, wherein the sheet further includes a second extrudate made from the first PTFE fine powder resin mixed with the processing lubricant at the first lube rate, wherein each of the first and second extrudates have a predefined thickness that is based on a die configuration of an extruder;
    the first extrudate forced into a portion of the second extrudate to form an integrated tape structure that is bi-axially stretched;
    the sheet is porous and has a gas permeability of in the range of 0.1 CFM to 0.30 CFM according to ASTM D737; and
    the sheet has an average Mullen Hydrostatic Burst pressure in the range of 135 psi to 175 psi according to ASTM D751.

2. The membrane of claim 1 wherein the sheet has a gas permeability of 0.2 CFM according to ASTM D737.

3. The membrane of claim 1 wherein the sheet has an average Mullen Hydrostatic Burst pressure in the range of 150 psi to 175 psi according to ASTM D751.

4. The membrane of claim 1 wherein the pore size is in the range of 0.01 micron to 0.25 micron.

5. The membrane of claim 1, wherein the predefined thickness is between approximately 0.035 inches and 0.045 inches.

6. A membrane comprising:
    a sheet of expanded polytetrafluoroethylene, the sheet including:
    a first extrudate made from a first PTFE fine powder resin mixed with processing lubricant at a first lube rate of between 14 wt-% to 22 wt-% of the processing lubricant to the first PTFE fine powder resin, the sheet further includes;
    a second extrudate made from the first PTFE fine powder resin mixed with the processing lubricant at the first lube rate, wherein each of the first and second extrudates have a predefined thickness of between approximately 0.035 inches and 0.045 inches;
    the first extrudate forced into a portion of the second extrudate to form an integrated tape structure that is bi-axially stretched to have a machine direction stretch ratio of between about 1.0 and 6.0 and a transverse direction width in the range of about eight to twelve times its original transverse width dimension;
    the sheet is porous and has a gas permeability in the range of 0.1 CFM to 3.0 CFM according to ASTM D737; and
    the sheet has an average Mullen Hydrostatic Burst pressure in the range of 135 psi to 175 psi according to ASTM D751.

7. The membrane of claim 6 wherein the first and second extrudates are combined into the integrated tape structure by a mechanical interlocking of nodes and fibrils making up the first and second extrudates.

8. The membrane of claim 6 wherein the sheet has a gas permeability of 0.2 CFM according to ASTM D737.

9. The membrane of claim 6 wherein the sheet has an average Mullen Hydrostatic Burst pressure in the range of 150 psi to 175 psi according to ASTM D751.

10. The membrane of claim 7 wherein the pore size is in the range of 0.01 micron to 0.25 micron.

11. The membrane of claim 6, wherein the first lube rate is between 14 wt-% to 17 wt-% of the processing lubricant to the first PTFE fine powder resin.

12. A method of making a membrane comprising the steps of:
    providing a first extrudate made from a first PTFE fine powder resin mixed with processing lubricant at a first lube rate of between 14 wt-% to 17 wt-% of the processing lubricant to the first PTFE fine powder resin;
    providing a second extrudate made from the first PTFE fine powder resin mixed with processing lubricant at the first lube rate, wherein each of the first and second extrudates have a predefined thickness that is based on a die configuration of an extruder;
    overlying the first and second extrudates;
    calendering the overlying first and second extrudates so that the first extrudate is forced into a portion of the second extrudate to form an integrated tape;
    stretching the integrated tape in the machine direction; and
    stretching the integrated tape in the transverse direction to provide a porous sheet that has a gas permeability in a range from 0.1 CFM to 0.30 CFM according to ASTM D737 and an average Mullen Hydrostatic Burst pressure in the range of 135 psi to 175 psi according to ASTM D751.

13. The method of claim 12 wherein the calendering step includes the step of combining the first and second extrudates into the integrated tape structure by a mechanically interlocking nodes and fibrils making up the first and second extrudates.

* * * * *